United States Patent Office 3,349,804
Patented Oct. 31, 1967

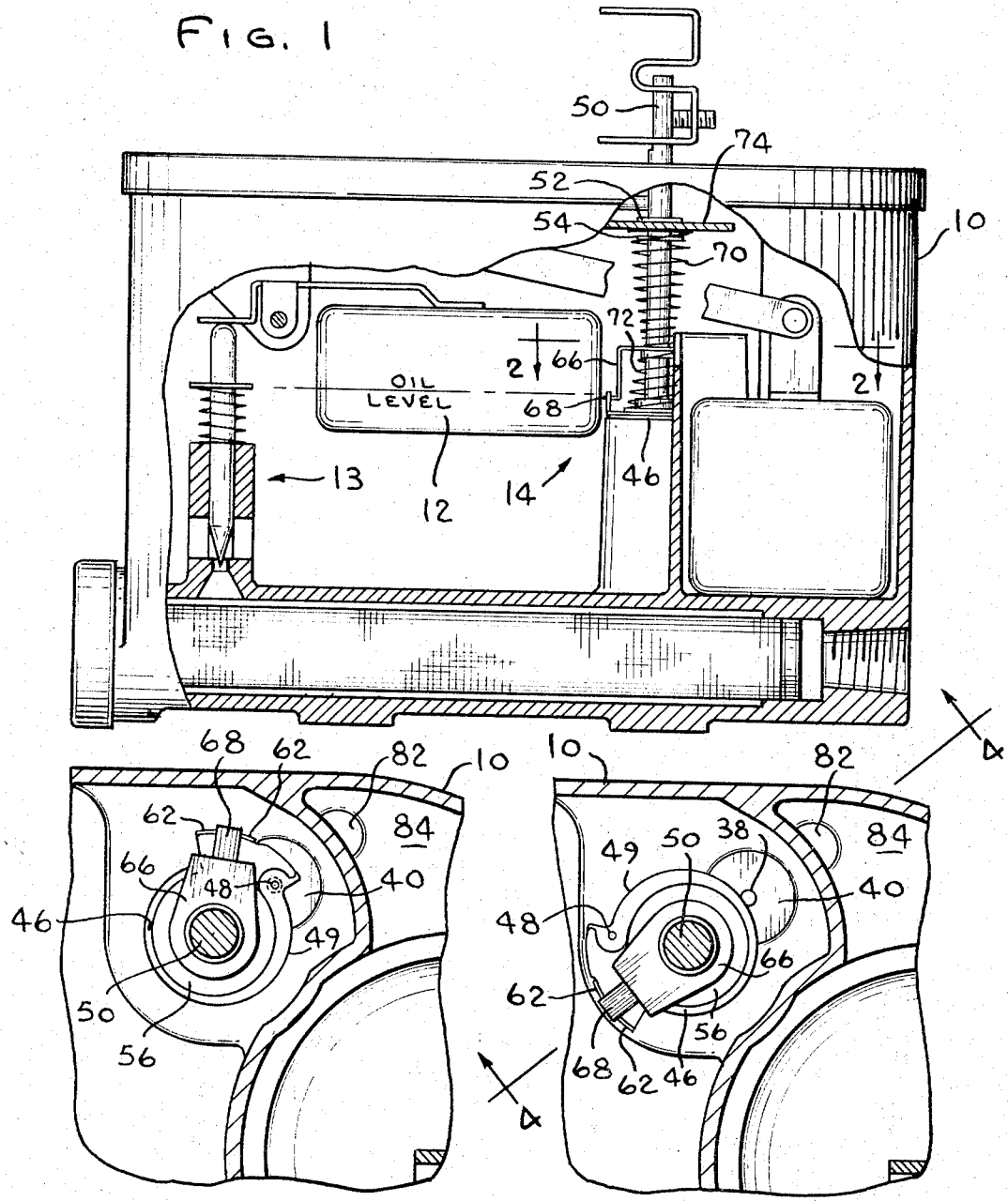

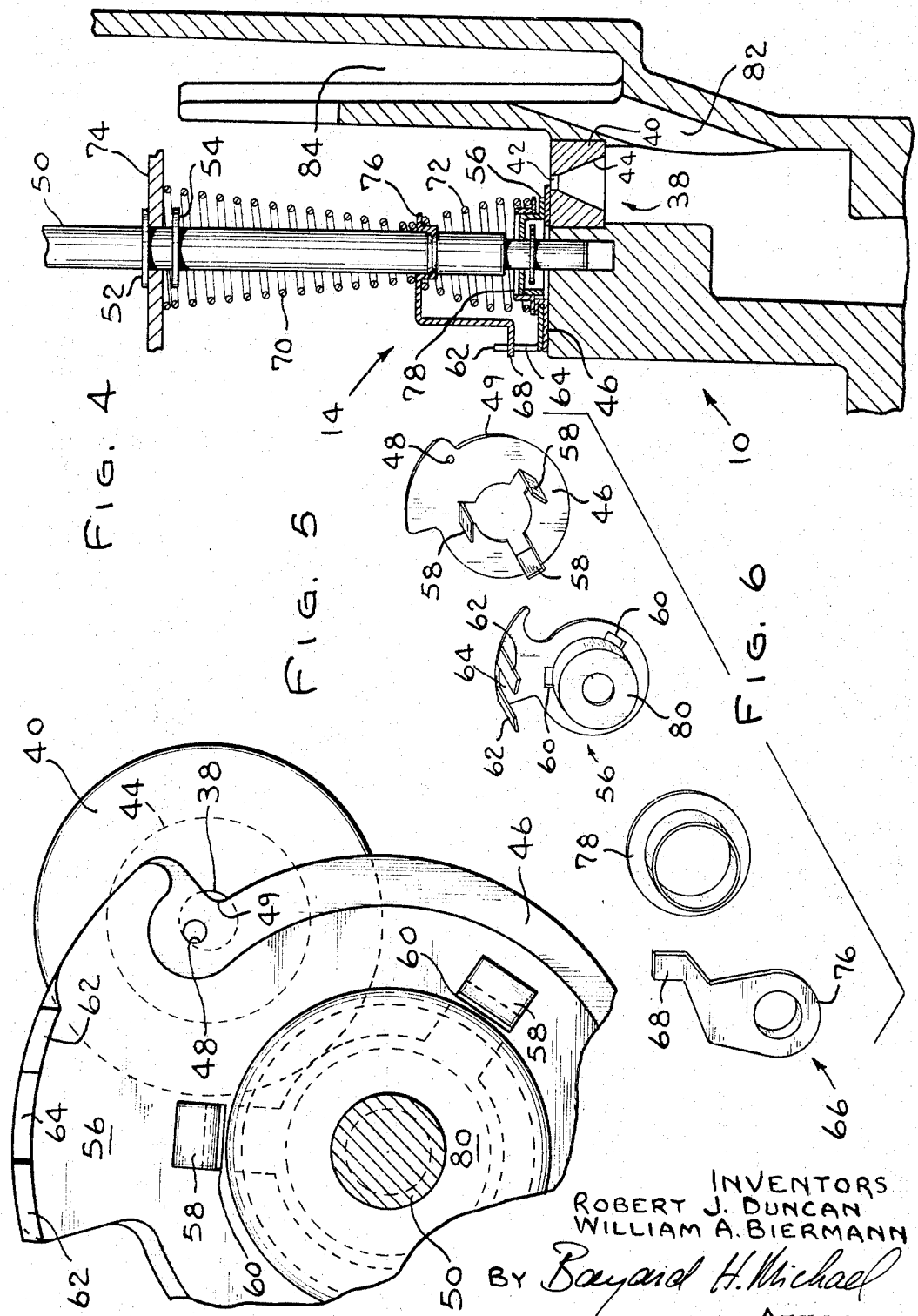

3,349,804
VISCOSITY COMPENSATING FUEL CONTROL
Robert J. Duncan, Delafield, and William A. Biermann, Brookfield, Wis., assignors to Controls Company of America, Melrose Park, Ill., a corporation of Delaware
Filed Sept. 16, 1965, Ser. No. 487,665
3 Claims. (Cl. 138—45)

ABSTRACT OF THE DISCLOSURE

The present disclosure shows a constant level oil flow control having an outwardly divergent outlet orifice and having a cam positioned over the entrance to the orifice to control flow therethrough. The cam has a small orifice which may be positioned over the outlet orifice to thereby provide for a pilot flow. The cam may be rotated to increase the flow through the outlet. The cam is so designed as to permit increase in the delivery flow before the small orifice within the cam is moved away from an overlying position in respect to the divergent outlet orifice.

This invention relates to improvements in metering valves for constant level oil flow control devices of the type employed to regulate fuel flow from a reservoir to a burner.

The principal object of this invention is to provide a metering valve of a design which will substantially diminish the effect of viscosity variations of the oil upon the flow rate through the metering valve.

Prior control devices of this type are subject to the objection that the flow rate through the metering valve is materially effected by variations in the oil viscosity, thereby causing insufficient oil delivery to the burner of a higher than rated viscosity oil, and causing excessive delivery of a lower than rated viscosity oil. The more frequent occurrences of improper oil delivery are found in countries where the user is unable to procure a continued supply of the same grade of oil or in localities where a substantial variation in oil viscosity is found within the same grade of oil. The effect of the viscosity variation is particularly objectionable at the pilot flow setting of the metering valve at which the proper flow rate in most commercial devices of this type equals 3 cc./min.

In present control devices with a head of 18″, low viscosity oils (1.5 centistokes) cause a 30% increase over the required 3 cc./min. flow rate, and high viscosity oils (6 centistokes) cause a 45% decrease below the required flow rate. At high fire settings, the proper flow rate is 35 cc./min. and the corresponding variations are an increase of 15% with the low viscosity oil and a decrease of 25% with the high viscosity oil.

We have discovered that by substituting an outwardly divergent or funnel shaped orifice for the straight metering orifices or metering slots used heretofore the +30% to −45% flow rate variation at pilot flow settings and the +15% to −25% variation at high fire settings may be reduced to approximately +10% to −10% variation for either pilot or high fire settings. The principle of viscosity compensation by the divergent metering orifice, as well as the particular advantages obtained by the several variations of the orifice design disclosed in the specification, will be better appreciated from the detail description found hereinafter in the specification.

A further object of this invention is to provide restricting means operable to vary the fuel delivery to the divergent orifice to thereby vary the fuel delivery to the burner.

Other objects and advantages will be pointed out in or be apparent from the specification and claims, as will obvious modifications of the embodiment shown in the drawings, in which:

FIG. 1 is a side view with parts broken away of a flow control device embodying the present invention;

FIG. 2 is an enlarged top view of the metering cam positioned over the metering orifice with the cam being in the pilot flow position;

FIG. 3 is a view similar to that of FIG. 2 except the cam is shown in the high fire position;

FIG. 4 is a cross-sectional view of the metering valve;

FIG. 5 is a further enlarged top view of the structure shown in FIGS. 2 and 3 with the metering cam being shown in the position as the fuel flow is changed from pilot to high fire flow;

FIG. 6 is an exploded view of the elements comprising the metering cam assembly.

Referring to the drawings in detail, FIG. 1 shows a constant level flow control device having a casing 10 in which the oil level is maintained by a float 12 which cooperates with an inlet valve 13 and having a metering valve 14 which is adapted to control oil delivery to a burner (not shown). Control devices of this type are well-known in the art and therefore their components and operation are not explained in detail herein. The invention lies in the metering valve 14.

The preferred embodiment of the present invention is shown in FIGS. 1–6. In this embodiment the downwardly extending orifice 38 is provided in a compensating block 40 which is positioned within the housing 10 as best shown in FIG. 4. The orifice has a small cylindrical portion 42 (0.055 diameter) and a layer funnel shaped portion 44 which preferably diverges downwardly and outwardly at an included angle of 40° to 50°.

In the illustrated embodiment the block is made of brass. This is mentioned, since a material having a greater wetting ability would require a greater included angle than required for brass and a material having less wetting ability would require a correspondingly smaller angle.

The flow through the metering orifice is controlled by the metering cam 46 which has a pilot flow orifice 48 and a high flow cam contour 49. The cam is preferably made of 0.001 inch stainless steel diaphragm stock, or of a somewhat thicker stock which has been ground down at the pilot flow orifice and at the cam contour to a feather edge. The thinness of the cam is important, since the flow through and past the cam is influenced by viscosity variations with such variation decreasing with a decrease in the stock thickness of the cam. At a thickness of 0.001 inch, the effect of the cam thickness upon the flow rates is practically negligible.

At a pilot flow setting, the pilot flow orifice 48 (diameter 0.020 inch) is positioned over the center of the metering orifice as shown in FIG. 2. At such time fuel, of course, flows through the orifice and forms a meniscus within the funnel portion of the metering orifice with the location of the meniscus being determined by the particular fuel viscosity.

As the metering stem 50 is rotated in a counterclockwise direction (FIG. 4), the contour 49 exposes part of the compensating orifice before the pilot flow orifice 48 leaves the compensating orifice 38 thereby providing a fuel flow without breaking its continuity as the flow is increased. This feature is important since a break in the flow could, at times, disturb the meniscus forming phenomena at an intermediate flow setting of the metering stem.

The embodiment shown in FIGS. 1–6 is provided with a metering stem which is adapted to permit some vertical travel (between flanges 52 and 54) without disturbing the cam setting. This feature is not part of this invention; nevertheless, it is the cause of the particular metering cam assembly. The metering cam is attached to a cam support 56 by tabs 58 which project through apertures 60 in the support member and clinch the same to thereby provide simultaneous rotation of the support member and the cam. The support member is provided with two upstanding prongs 62 which define a central slot 64. A crank member 66 is fixed to the metering slot and has a tab 68 projecting into the slot 64 to thereby transfer rotary motion of the metering stem to the cam. Because of the slot-tab connection, limited vertical movement of the metering stem is permissible without affecting the transfer of rotary metering stem motion to the cam.

The metering stem is maintained in position by compression springs 70 and 72, the former being engaged by the transversely extending member 74 and the flange 76 of the crank member, and the latter being engaged by a flanged bushing 78 and the crank member. The bushing 78 extends over the hub portion 80 of the cam support (FIG. 4) and its flange rests on the outwardly turned tab portions 68 to thereby press the cam against the top surface of the block 40.

An air vent 82 is provided immediately next to the lower end of the metering orifice and permits air to escape into the overflow chamber 84 of the control.

In summary, the disclosed control permits substantially uniform fuel flow rate through a control in which the head above the entrance into discharge or metering orifice is maintained substantially constant, the viscosity compensation being attained by varying the negative head within the funnel shaped discharge orifice.

Although but one embodiment of the present invention has been illustrated and described, it will be apparent to those skilled in the art that various changes and modifications may be made therein without departing from the spirit of the invention or from the scope of the appended claims.

We claim:

1. Means for diminishing the effect of fuel viscosity variations upon the rate of flow through a fuel flow control device comprising, a compensating orifice adapted to pass fuel therethrough, said compensating orifice having a neck and a divergent contour in the direction of fuel flow, said compensating orifice being operable to have the fuel passed therethrough form a meniscus in said divergent contour, the distance between said neck and the meniscus increasing with an increase in fuel viscosity, and restricting means movable solely outside of said orifice and being operable to vary the fuel flow to said orifice in accordance with such movement, said restricting means being comprised of a cam overlying said compensating orifice, said cam having a pilot flow orifice adapted to be positioned over said compensating orifice, said cam also having a contoured portion adapted to be moved over said compensating orifice to increase the flow therethrough, said pilot flow orifice and said contour and pilot flow orifice being so positioned in respect to each other that said contour moves over said compensating orifice before said pilot flow orifice is fully removed from a position overlying said compensating orifice to thereby avoid an interruption in flow during such movement.

2. The structure acording to claim 1 wherein said divergent contour has an included angle within the range of 40 to 50 degrees.

3. The structure according to claim 1 wherein said cam is below 0.005 inch in thickness.

References Cited
UNITED STATES PATENTS

| | | | |
|---|---|---|---|
| 1,986,600 | 1/1935 | Pigott | 138—45 |
| 2,397,120 | 3/1946 | Breese et al. | 158—38 |
| 2,427,059 | 9/1947 | Landon | 137—400 X |
| 2,701,030 | 2/1955 | Hazelton | 251—208 X |

FREDERICK KETTERER, *Primary Examiner.*